(12) United States Patent
Neyama et al.

(10) Patent No.: US 11,585,673 B2
(45) Date of Patent: Feb. 21, 2023

(54) DATA UPDATING DEVICE, DATA UPDATING METHOD, AND STORAGE MEDIUM STORING DATA UPDATING PROGRAM

(71) Applicant: TOYOTA JIDOSHA KABUSHIKI KAISHA, Toyota (JP)

(72) Inventors: Ryo Neyama, Nerima-ku (JP); Sylvain Lefebvre, Setagaya-ku (JP); Masahiro Tanaka, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/094,329

(22) Filed: Nov. 10, 2020

(65) Prior Publication Data

US 2021/0140790 A1 May 13, 2021

(30) Foreign Application Priority Data

Nov. 12, 2019 (JP) .............................. JP2019-204901

(51) Int. Cl.
*G01C 21/00* (2006.01)

(52) U.S. Cl.
CPC ..... *G01C 21/3815* (2020.08); *G01C 21/3841* (2020.08)

(58) Field of Classification Search
CPC ....................................... G01C 21/3804–3859
See application file for complete search history.

(56) References Cited

U.S. PATENT DOCUMENTS

| 7,082,443 B1* | 7/2006 | Ashby ................... G06F 16/273 |
| | | 342/357.41 |
| 2016/0313131 A1* | 10/2016 | Kaneshiro .............. G01C 21/32 |
| 2017/0122747 A1* | 5/2017 | Park ....................... G01C 21/26 |
| 2018/0038709 A1 | 2/2018 | Takahashi |

FOREIGN PATENT DOCUMENTS

JP     2018-025865 A    2/2018

* cited by examiner

*Primary Examiner* — Aaron L Troost
(74) *Attorney, Agent, or Firm* — Oblon, McClelland, Maier & Neustadt, L.L.P.

(57) ABSTRACT

A data updating device sets, with respect to map data in which road links are represented as line segment sequences, a plurality of first straight lines extending in a first direction and a plurality of second straight lines extending in a second direction that intersects with the first direction, to thereby generate mesh map data. Then, the data updating device sets a set L of points or line segments that represent the update location, sets a set V including a plurality of first straight lines, and sets a set H including a plurality of second straight lines. Then, the data updating device sets the state of each mesh based on the set L, the set V, and the set H.

5 Claims, 16 Drawing Sheets

DATA UPDATING DEVICE, DATA UPDATING METHOD, AND STORAGE MEDIUM STORING DATA UPDATING PROGRAM

CROSS-REFERENCE TO RELATED APPLICATION

This application is based on and claims priority under 35 USC 119 from Japanese Patent Application No. 2019-204901 filed on Nov. 12, 2019, the disclosure of which is incorporated by reference herein.

BACKGROUND

Technical Field

The disclosed technology relates to a data update device, a data update method, and a storage medium that stores a data update program.

Background Art

Japanese Patent Application Laid-Open (JP-A) No. 2018-25865 discloses a technology for suppressing unnecessary data from being transmitted from a vehicle to a server. This technology determines not to transmit road-related data from a vehicle to a server when a predetermined condition is satisfied when collecting image data to be used for updating map information and the like.

BRIEF SUMMARY

Means for Solving the Problem

In a case of updating map data based on new data acquired by a vehicle, it is necessary to determine which part of the map data is newly required. In this case, when the map data is divided by plural meshes, it is necessary to determine whether or not new data is required for each of the meshes. Note that, hereinafter, data in which plural meshes and information on the necessity of updating the data in the meshes are combined is referred to as mesh map data.

For example, consider a case in which mesh map data in the east-west direction is divided into M sections and mesh map data in the north-south direction is divided into N sections. In this case, since there are M×N meshes on the mesh map data, it is necessary to determine whether or not the data in the meshes needs to be updated, in principle, M×N times. However, there is a problem in that as M and N increase, the calculation cost of M×N determinations increases, and update processing of the mesh map data takes time.

In the technology of Japanese Patent Application Laid-Open (JP-A) No. 2018-25865, when transmitting data from the vehicle to the server, while it is determined whether or not transmission of the data is necessary, the calculation cost required for updating mesh map data in order to determine whether or not transmission of that data is necessary is not taken into consideration. Therefore, in the technology disclosed in Japanese Patent Application Laid-Open (JP-A) No. 2018-25865, there is a problem in that the calculation load when updating the mesh map data used to determine whether or not acquisition of new data is necessary cannot be reduced.

The present disclosure takes the above facts into consideration and aims to provide a data updating device, a data updating method, and a data updating program that can reduce a calculation load in a case of updating mesh map data used in determining whether or not acquisition of new data is necessary.

Means for Solving the Problem

A first aspect is a data updating device including a memory and a processor that is coupled to the memory. The processor sets, with respect to map data, plural first straight lines extending in a first direction and plural second straight lines extending in a second direction that intersects with the first direction. Accordingly, the processor generates plural meshes that are surrounded by the plural first straight lines and the plural second straight lines, and generates mesh map data including the plural meshes. The processor sets a group L of points or line segments, which represent an update location, sets a group V including the plural first straight lines, and sets a group H including the plural second straight lines. Based on the group L, the group V, and the group H, which have been set, in a case in which the points or the line segments included in the group L overlap with any of the plural first straight lines included in the group V, the processor sets a status of a mesh corresponding to locations at which the plural first straight lines and the points or the line segments overlap as an update status. The update status indicates a state in which a data update is required. In a case in which the points or the line segments included in the group L overlap with any of the plural second straight lines included in the group H, the processor sets a status of a mesh corresponding to locations at which the plural second straight lines and the points or the line segments overlap as the update status. In a case in which the points or the line segments included in the group L do not intersect with any of the plural first straight lines included in the group V, the processor sets a status of a mesh of a location corresponding to a first straight line having an intersection point when a start point and an end point of the points or the line segments are projected in the second direction as the update status. In a case in which the points or the line segments included in the group L do not intersect with any of the plural second straight lines included in the group H, the processor sets a status of a mesh of a location corresponding to a second straight line having an intersection point when a start point and an end point of the points or the line segments are projected in the first direction as the update status. In a case in which the points or the line segments included in the group L intersect with any of the plural first straight lines included in the group V, the processor sets a status of a mesh corresponding to an intersection point with the first straight line and a status of a mesh adjacent to the mesh corresponding to an intersection point with the first straight line on the first straight line as the update status In a case in which the points or the line segments included in the group L intersect with any of the plural second straight lines included in the group H, the processor sets a status of a mesh corresponding to an intersection point with the second straight line and a status of a mesh adjacent to the mesh corresponding to an intersection point with the second straight line on the second straight line as the update status.

In this manner, the data updating device sets, with respect to map data, plural first straight lines extending in a first direction and plural second straight lines extending in a second direction that intersects with the first direction. Then, the data update device determines whether the points or line segments representing the update location and the first straight lines or the second straights line intersect or overlap, and updates the status of the mesh according to the determination result. As a result, the calculation load can be reduced as compared to a case in which the necessity of updating the status is determined for each of plural meshes.

Further, the data updating device according to a second aspect splits a line segment sequence representing a road link into line segments to thereby set the group L of plural split line segments. As a result, it is possible to reduce the calculation load required for determining whether or not the data of the location corresponding to the road link is necessary.

In addition, in the data updating device according to a third aspect, in a case in which a road link for which acquisition of data is required is added to the map data, the data updating device updates a status of each mesh corresponding to a part including the road link for which acquisition of data is required based on the group L, the group V, and the group H corresponding to the road link for which acquisition of data is required. As a result, when a new road link is added and the data of the location corresponding to the road link is needed, the calculation load is reduced and the mesh map data used for determining the necessity of new data acquisition can be updated.

A data updating method according to a fourth aspect is a data updating method executed by a data updating device including a memory and a processor coupled to the memory. The processor sets, with respect to map data, plural first straight lines extending in a first direction and plural second straight lines extending in a second direction that intersects with the first direction. Accordingly, the processor generates plural meshes that are surrounded by the plural first straight lines and the plural second straight lines, and generates mesh map data including the plural meshes. The processor sets a group L of points or line segments, which represent an update location, sets a group V including the plural first straight lines, and sets a group H including the plural second straight lines. Based on the group L, the group V, and the group H, which have been set, in a case in which the points or the line segments included in the group L overlap with any of the plural first straight lines included in the group V, the processor sets a status of a mesh corresponding to locations at which the plural first straight lines and the points or the line segments overlap as an update status. The update status indicates a state in which a data update is required. In a case in which the points or the line segments included in the group L overlap with any of the plural second straight lines included in the group H, the processor sets a status of a mesh corresponding to locations at which the plural second straight lines and the points or the line segments overlap as the update status. In a case in which the points or the line segments included in the group L do not intersect with any of the plural first straight lines included in the group V, the processor sets a status of a mesh of a location corresponding to a first straight line having an intersection point when a start point and an end point of the points or the line segments are projected in the second direction as the update status. In a case in which the points or the line segments included in the group L do not intersect with any of the plural second straight lines included in the group H, the processor sets a status of a mesh of a location corresponding to a second straight line having an intersection point when a start point and an end point of the points or the line segments are projected in the first direction as the update status. In a case in which the points or the line segments included in the group L intersect with any of the plural first straight lines included in the group V, the processor sets a status of a mesh corresponding to an intersection point with the first straight line and a status of a mesh adjacent to the mesh corresponding to an intersection point with the first straight line on the first straight line as the update status In a case in which the points or the line segments included in the group L intersect with any of the plural second straight lines included in the group H, the processor sets a status of a mesh corresponding to an intersection point with the second straight line and a status of a mesh adjacent to the mesh corresponding to an intersection point with the second straight line on the second straight line as the update status.

A fifth aspect is a non-transitory storage medium that stores a data updating program to be executed by a computer. The processor of the computer that executes the data updating program sets, with respect to map data, plural first straight lines extending in a first direction and plural second straight lines extending in a second direction that intersects with the first direction. Accordingly, the processor generates plural meshes that are surrounded by the plural first straight lines and the plural second straight lines, and generates mesh map data including the plural meshes. The processor sets a group L of points or line segments, which represent an update location, sets a group V including the plural first straight lines, and sets a group H including the plural second straight lines. Based on the group L, the group V, and the group H, which have been set, in a case in which the points or the line segments included in the group L overlap with any of the plural first straight lines included in the group V, the processor sets a status of a mesh corresponding to locations at which the plural first straight lines and the points or the line segments overlap as an update status. The update status indicates a state in which a data update is required. In a case in which the points or the line segments included in the group L overlap with any of the plural second straight lines included in the group H, the processor sets a status of a mesh corresponding to locations at which the plural second straight lines and the points or the line segments overlap as the update status. In a case in which the points or the line segments included in the group L do not intersect with any of the plural first straight lines included in the group V, the processor sets a status of a mesh of a location corresponding to a first straight line having an intersection point when a start point and an end point of the points or the line segments are projected in the second direction as the update status. In a case in which the points or the line segments included in the group L do not intersect with any of the plural second straight lines included in the group H, the processor sets a status of a mesh of a location corresponding to a second straight line having an intersection point when a start point and an end point of the points or the line segments are projected in the first direction as the update status. In a case in which the points or the line segments included in the group L intersect with any of the plural first straight lines included in the group V, the processor sets a status of a mesh corresponding to an intersection point with the first straight line and a status of a mesh adjacent to the mesh corresponding to an intersection point with the first straight line on the first straight line as the update status In a case in which the points or the line segments included in the group L intersect with any of the plural second straight lines included in the group H, the processor sets a status of a mesh corresponding to an intersection point with the second straight line and a status of a mesh adjacent to the mesh corresponding to an intersection point with the second straight line on the second straight line as the update status.

Advantageous Effects

As described above, according to the disclosed technology, there is an effect that the calculation load can be reduced when updating the mesh map data used for determining the necessity of new data acquisition.

DETAILED DESCRIPTION

Hereinafter, the data update device of the present embodiment will be described with reference to the drawings.

Figure 1:
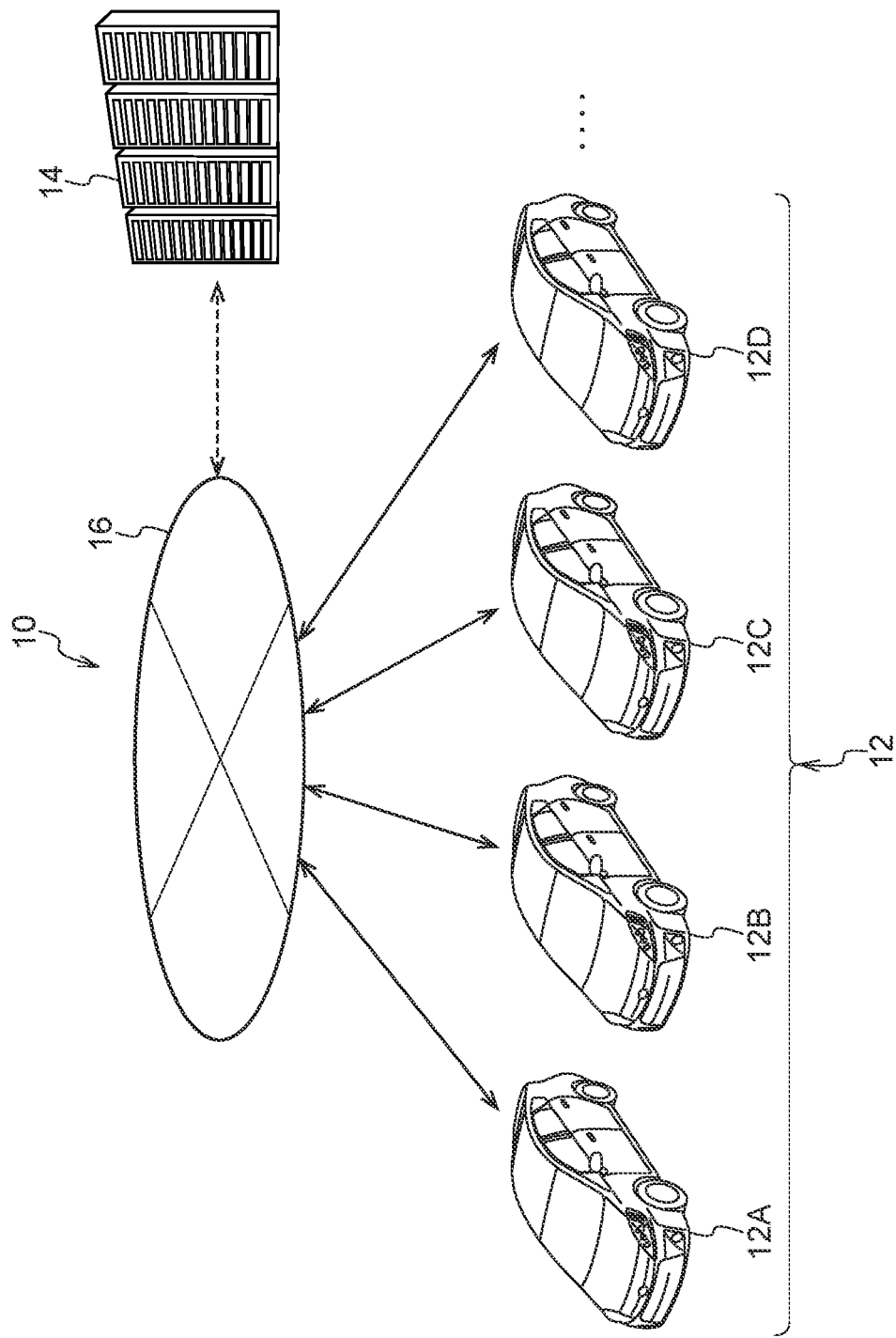
FIG. 1 is a schematic configuration diagram of a data collection system of the present embodiment.

FIG. 1 is a diagram showing an example of a schematic configuration of a data collection system according to the present embodiment. As shown in FIG. 1, the data collection system 10 of the present embodiment includes plural vehicles 12A, 12B, 12C, 12D and a data update device 14. The plural vehicles 12A, 12B, 12C, 12D and the data updating device 14 are connected by a network 16 such as the Internet. Note that, hereinafter, the vehicles 12A, 12B, 12C, and 12D are simply referred to as "vehicles 12", except for indicating a specific vehicle among the plural vehicles 12A, 12B, 12C, and 12D.

The data collection system 10 of the present embodiment updates the map data held by the data updating device 14 based on the data transmitted from the vehicle-mounted device of the vehicle 12. For example, the in-vehicle device of the vehicle 12 transmits the front image captured by the in-vehicle camera mounted in the vehicle to the data updating device 14. Then, the data updating device 14 updates the map data based on the front image transmitted from the vehicle-mounted device of the vehicle 12.

In this case, the data updating device 14 identifies which part of the map data needs new data. Then, the data updating device 14 transmits the part where new data is needed to the in-vehicle device of the vehicle 12. The vehicle 12 travels in a place where new data is required, which is transmitted from the data updating device 14, collects the data, and transmits the data to the data updating device 14. Then, the data updating device 14 updates the map data based on the data transmitted from the vehicle 12.

However, in this case, it is necessary for the data updating device 14 to determine which part of the map data needs new data.

Figure 2:
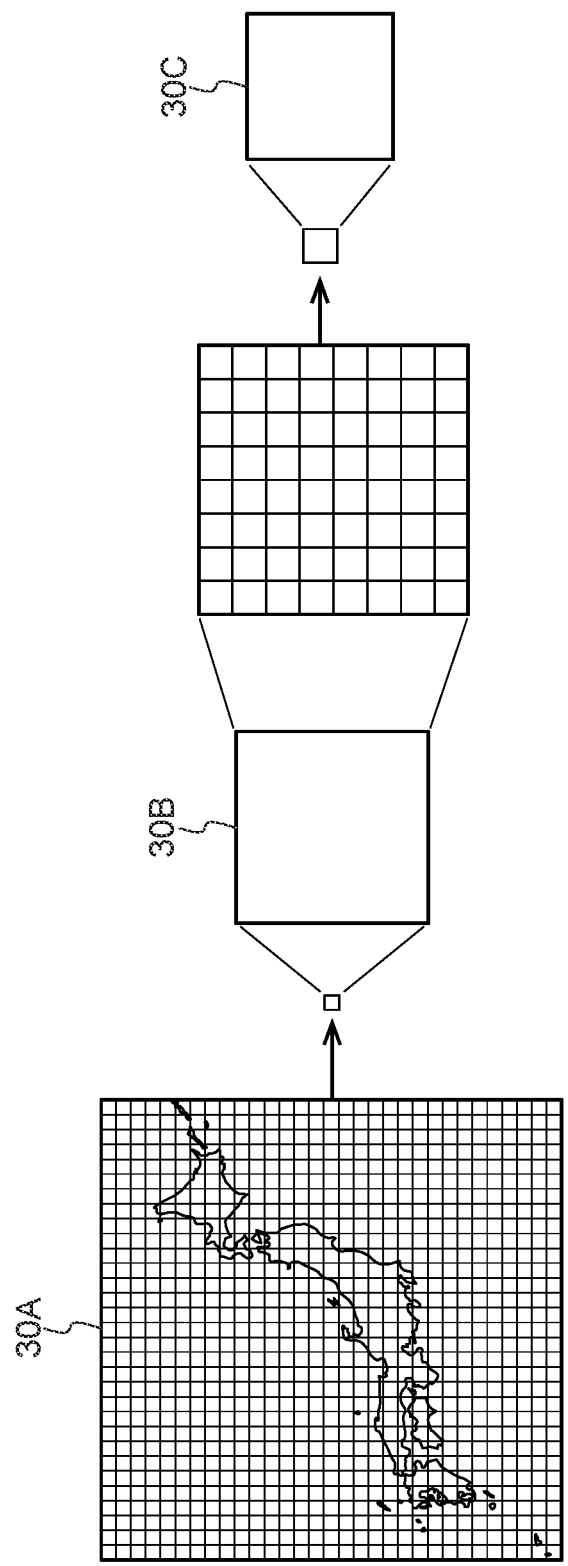
FIG. 2 is a diagram for explaining a mesh of the present embodiment.

For example, mesh map data obtained by dividing the map data into meshes may be used when determining which part of the map data needs to be newly collected. FIG. 2 shows a diagram for explaining the mesh map data. As shown in FIG. 2, the map data 30A is divided into segments 30B, and the segments 30B are further divided into meshes 30C to generate mesh map data. The mesh map data is data in which plural meshes and information on the necessity of updating the data in the mesh are combined. It is determined for each mesh which data in the mesh map data is newly required.

Figure 3:
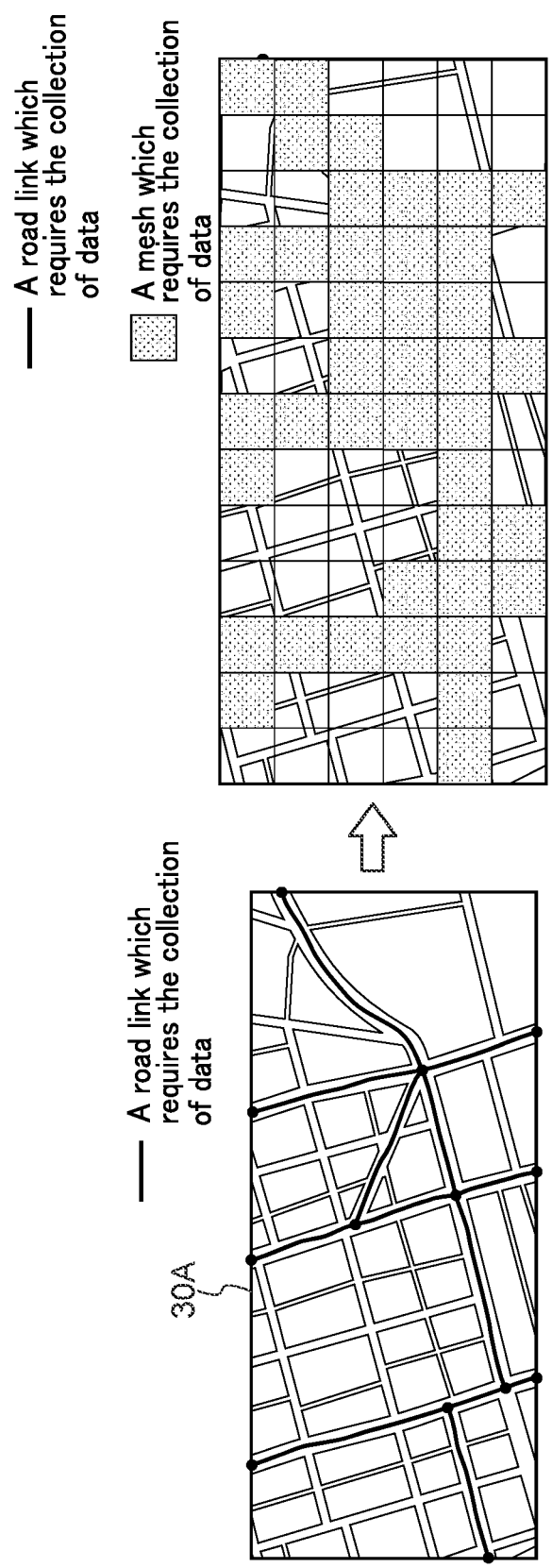
FIG. 3 is a diagram for explaining updating of a mesh state.
Figure 4:
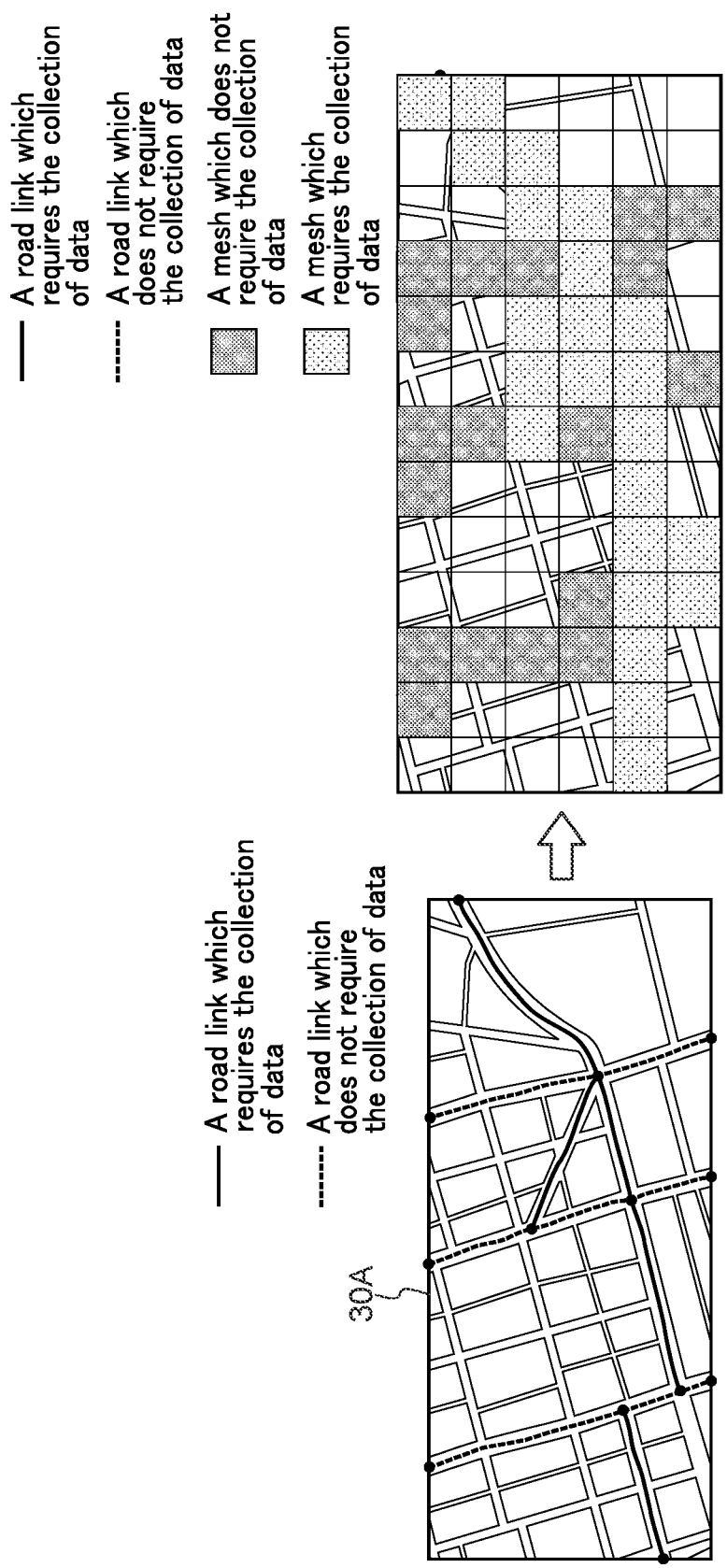
FIG. 4 is a diagram for explaining updating of a mesh state.

FIG. 3 and FIG. 4 are diagrams for explaining the updating of the state of road links and meshes. As shown in FIG. 3, road links that require data collection are shown on the map data.

Upon the mesh information of FIG. 3 being transmitted to the vehicle 12, when the vehicle 12 travels through a mesh portion corresponding to a road link for which data collection is required, the vehicle 12 transmits data obtained at that portion to the data update device 14.

When the data is collected by the vehicle 12, the data collection is completed at the place where the data collection was necessary, and the data collection is unnecessary. Therefore, as shown in FIG. 4, the mesh for which data collection is necessary is updated to a mesh for which data collection is unnecessary.

As shown in FIG. 4, the mesh that needs data collection is gradually updated to a mesh that does not require data collection. At this time, if a road link is newly added or deleted on the map data, the state of the mesh that overlaps the road link needs to be updated to a mesh that requires data collection.

Therefore, the data updating device 14 of the present embodiment determines whether the straight line in the north-south direction that constitutes the mesh map data intersects or overlaps with the line segment of the road link, and according to the determination result, the status of each mesh of the mesh map data is updated. Further, the data updating device 14 of the present embodiment determines whether or not the straight line in the east-west direction intersects or overlaps with the line segment of the road link, and updates the state of each mesh of the mesh map data according to the determination result. As a result, the calculation load can be significantly reduced as compared with the case of determining the overlap with the road link for each plural meshes.

The details will be described below.

Figure 5:
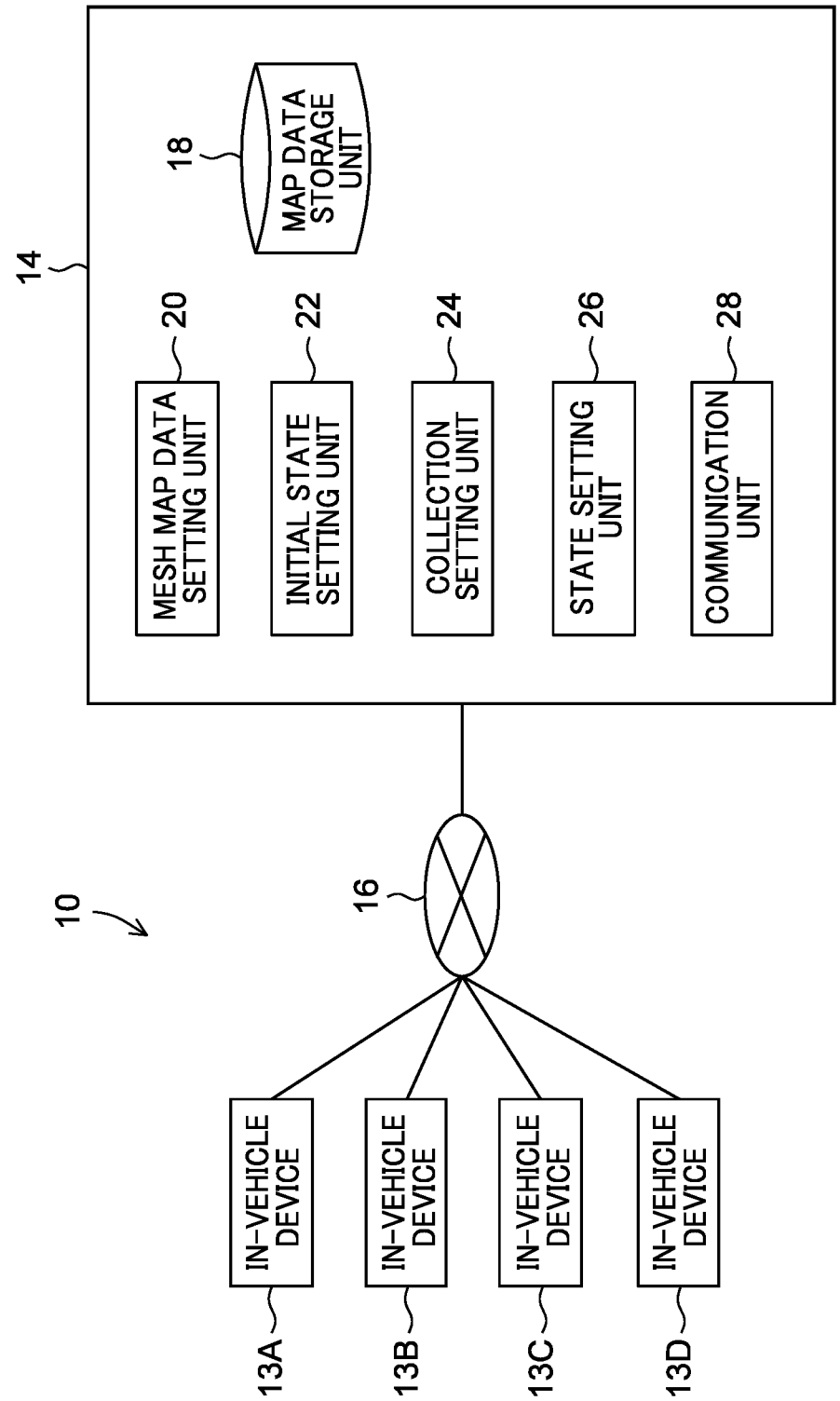
FIG. 5 is a schematic block diagram of a data update device according to the present embodiment.

FIG. 5 is a block diagram showing an example of a schematic configuration of a data collection system 10 according to the present embodiment. As shown in FIG. 5, the data collection system 10 of the present embodiment includes a plurality of vehicle-mounted devices 13A, 13B, 13C, 13D and a data update device 14. The plurality of vehicle-mounted devices 13A, 13B, 13C, 13D are mounted in the plurality of vehicles 12A, 12B, 12C, 12D, respectively. Note that, hereinafter, the in-vehicle devices 13A, 13B, 13C, 13D will be simply referred to as "in-vehicle device 13", except for indicating a specific vehicle device among the plurality of in-vehicle devices 13A, 13B, 13C, 13D.

Figure 14:
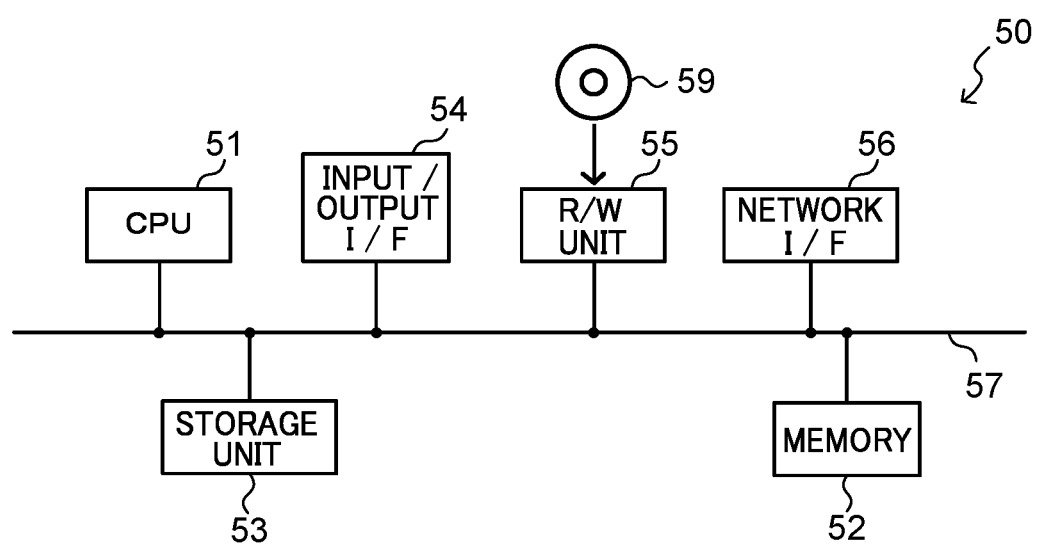
FIG. 14 is a diagram illustrating a configuration example of a computer of a data updating device.

As shown in FIG. 5, the data updating device 14 includes a map data storage unit 18, a mesh map data setting unit 20, an initial state setting unit 22, a collection setting unit 24, a state setting unit 26, and a communication unit 28. As discussed below, the data updating device 14 can be realized by, for example, a computer 50 as shown in FIG. 14.

The map data storage unit 18 stores map data.

The mesh map data setting unit 20 sets, for the map data stored in the map data storage unit 18, a plurality of first straight lines extending in the north-south direction and a plurality of second straight lines extending in the east-west direction. As a result, mesh map data including a plurality of meshes surrounded by the plurality of first straight lines and the plurality of second straight lines is generated.

Figure 6:
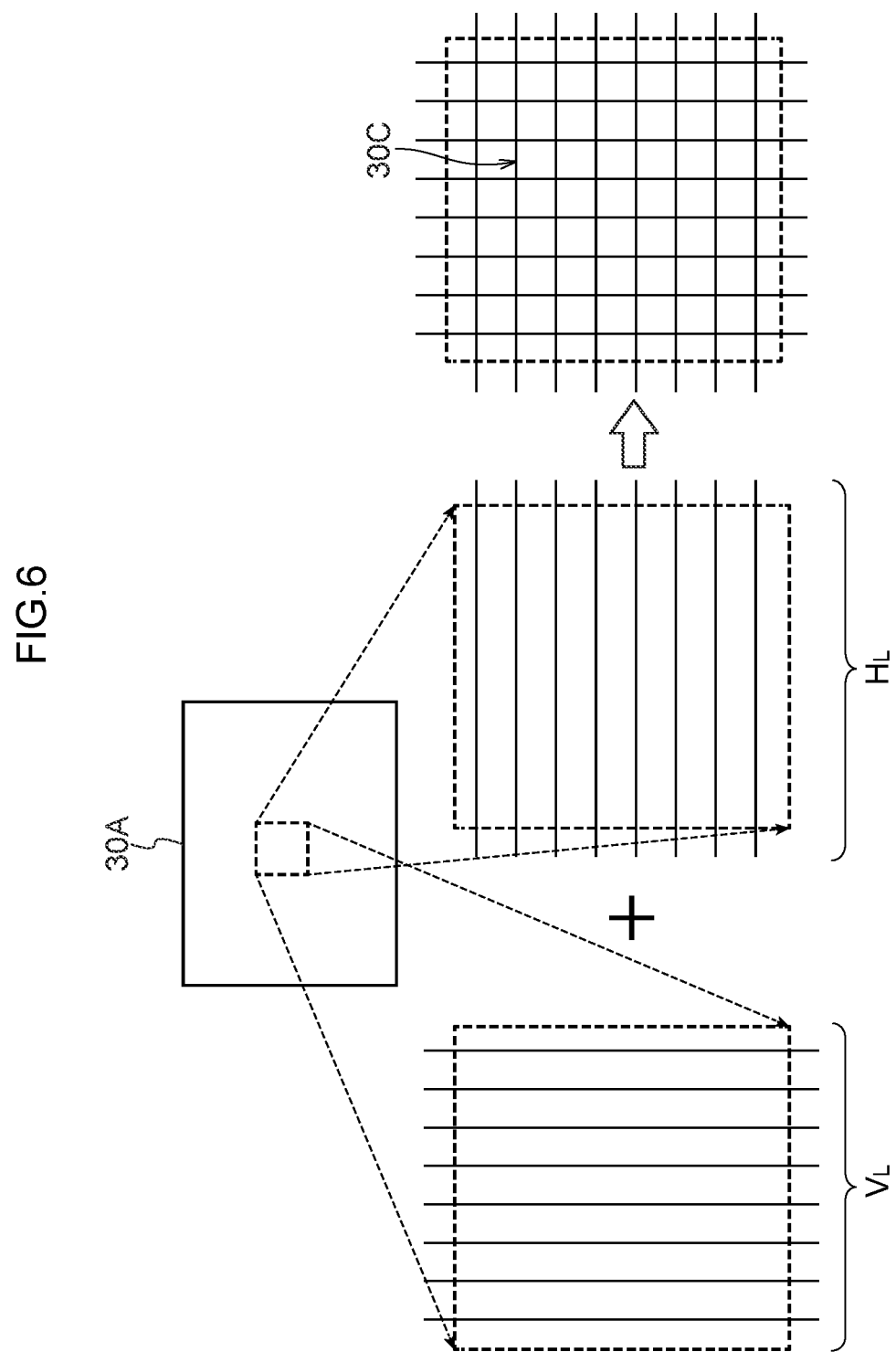
FIG. 6 is a diagram for explaining generation of mesh map data.

Specifically, as shown in FIG. 6, the mesh map data setting unit 20 sets the first straight lines $V_L$ in the north-south direction and the second straight lines $H_L$ in the east-west direction with respect to the map data 30A. As a result, mesh map data having a plurality of meshes 30C is generated as shown in FIG. 6. The north-south direction is an example of the first direction, and the east-west direction is an example of the second direction.

The initial state setting unit 22 sets each initial state of the mesh set by the mesh map data setting unit 20 and surrounded by the plurality of first straight lines and the plurality of second straight lines. For example, the initial state setting unit 22 sets "0" indicating that data collection is unnecessary as the initial state of each of these plurality of meshes.

Figure 7:
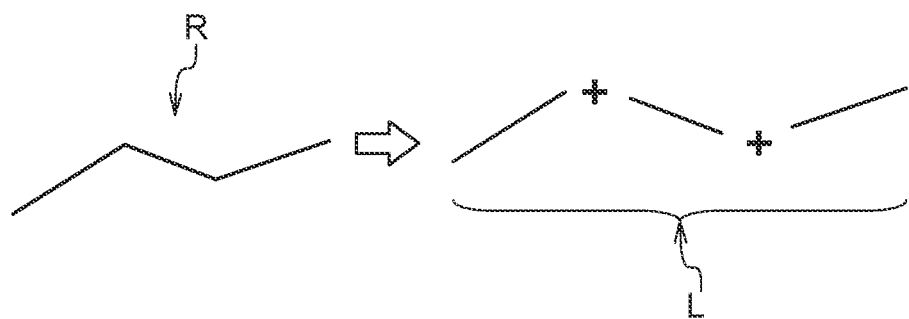
FIG. 7 is a diagram for explaining division of a line segment of a road link.
Figure 8:
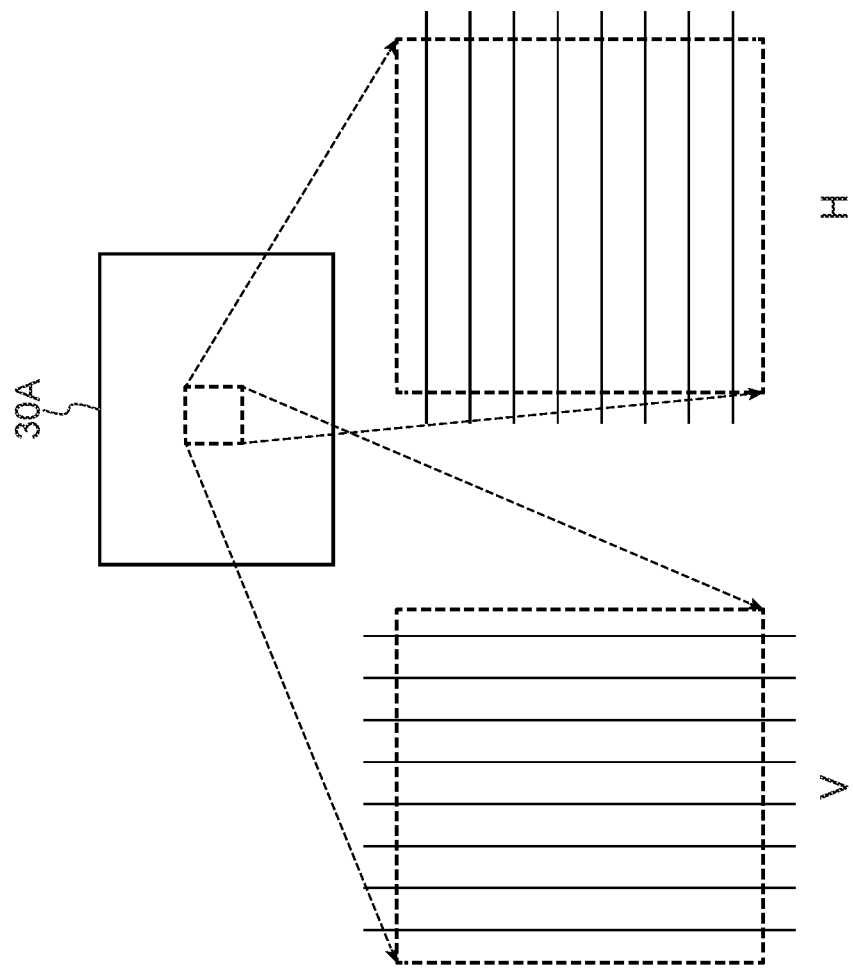
FIG. 8 is a diagram for explaining a set V of first straight lines and a set H of second straight lines.

The collection setting unit 24 breaks down the line segment sequence representing the road link corresponding to the update location into line segments, and sets these line segments as set L. FIG. 7 shows a diagram for explaining disassembly of road links. As shown in FIG. 7, the collection setting unit 24 sets a set L of a plurality of decomposed line segments by decomposing the line segment sequence representing the road link R into line segments. Further, as shown in FIG. 8, the set setting unit 24 sets a set V including a plurality of first straight lines extending in the north-south direction and a set H including a plurality of second straight lines extending in the east-west direction.

Based on the set L, the set V, and the set H generated by the set setting unit 24, the state setting unit 26 determines whether or not it is necessary to collect each data in the plurality of meshes of the mesh map data. The state setting unit 26 may determine whether or not each data in the plurality of meshes of the mesh map data needs to be updated based on the set L, the set V, and the set H.

Specifically, when the line segment included in the set L overlaps with the first straight line included in the set V, the state setting unit 26 sets a state of the mesh surrounded by the overlapping first lines as an update state indicating a state that an update of data is necessary. Further, when the line segment included in the set L overlaps with the second straight line included in the set H, the state setting unit 26 sets the state of the mesh surrounded by the overlapping second straight lines as the update state.

Figure 9:
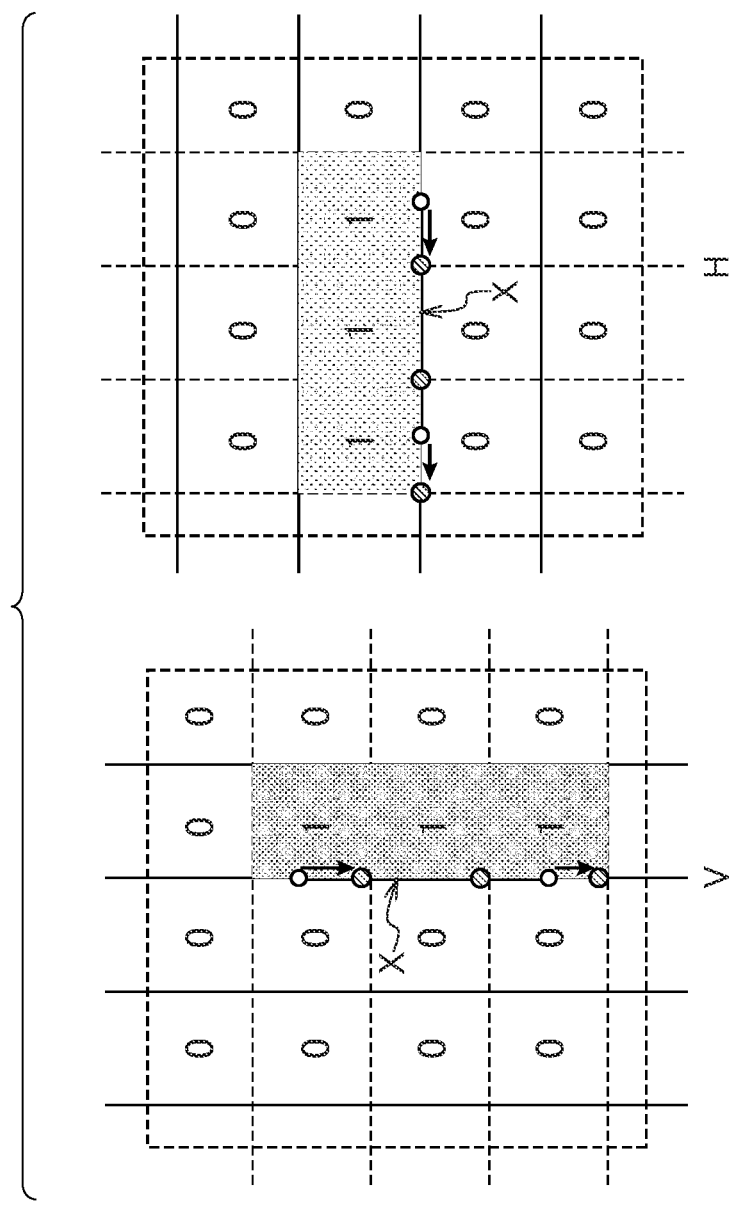
FIG. 9 is a diagram for explaining updating of a mesh state.

FIG. 9 shows a diagram for explaining the state update of the mesh when the line segment overlaps the first straight line or the second straight line.

As shown on the left side of FIG. 9, when the line segment X included in the set L and the first straight line overlap with each other, the state setting unit 26 sets "1", indicating an update state, as the state of the mesh surrounded by these straight lines. Note that when the state setting unit 26 specifies the mesh surrounded by the straight lines that overlap with the line segment X included in the set L, for example, as shown in FIG. 9, the state setting unit 26 sets position coordinates in the south direction seen from the overlapping locations. Then, the state setting unit 26 sets the mesh having the specified position coordinates as the point of origin as the update state "1".

As shown on the right side of FIG. 9, when the line segment X included in the set L and the second straight line overlap with each other, the state setting unit 26 sets "1", indicating an update state, as the state of the mesh surrounded by these straight lines. Note that when the state setting unit 26 specifies the mesh surrounded by the straight lines that overlap with the line segment X included in the set L, for example, as shown on the right side of FIG. 9, the state setting unit 26 sets position coordinates in the west direction seen from the overlapping locations. Then, the state setting unit 26 sets the mesh having the specified position coordinates as the point of origin as the update state "1".

Further, when the line segment included in the set L does not intersect with any first straight line included in the set V, the state setting unit 26 sets the state of the mesh of the location corresponding to the first straight line having an intersection point when the start point and the end point of the line segment are projected in the east-west direction as the update state. Further, when the line segment included in the set L does not intersect with any second straight line included in the set H, the state setting unit 26 sets the state of the mesh of the location corresponding to the second straight line having an intersection point when the start point and the end point of the line segment are projected in the north-south direction as the update state.

Figure 10:
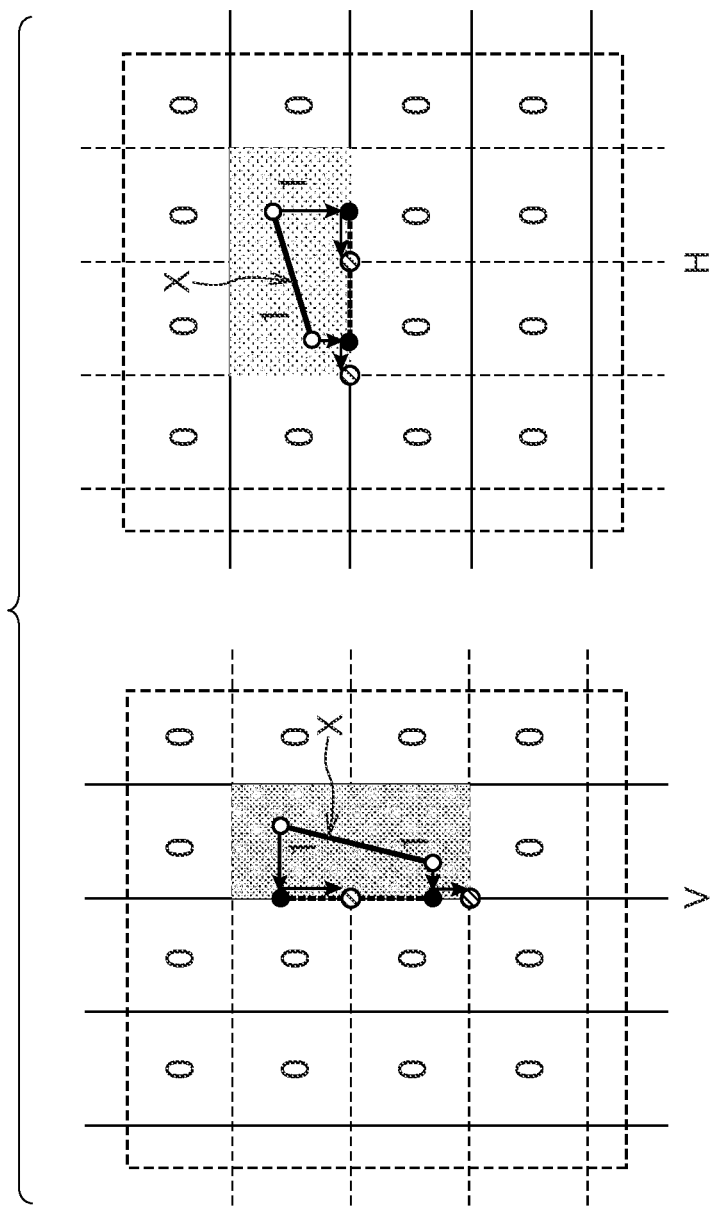
FIG. 10 is a diagram for explaining updating of a mesh state.

FIG. 10 shows a diagram for explaining the state update of the mesh when the line segment does not overlap with the first straight line or the second straight line. As shown on the left side of FIG. 10, when the line segment X included in the set L does not intersect with any of the first straight lines, the state setting unit 26 projects the line segment in the east-west direction, and sets the state of the mesh of the location corresponding to the first straight line having the intersection point when the line segment is projected. In FIG. 10, the state setting unit 26 projects the line segment in the west direction, and sets the state of the mesh at the location corresponding to the first straight line having the intersection point when projected to "1". Further, as shown on the right side of FIG. 10, when the line segment X included in the set L does not intersect with any second straight line, the state setting unit 26 projects the line segment in the north-south direction, and sets the state of the mesh at the location corresponding to the second straight line having the intersection point when projected to "1". In FIG. 10, the state setting unit 26 projects the line segment in the south direction, and sets the state of the mesh at the location corresponding to the second straight line having the intersection when projected to "1".

Further, when the line segment included in the set L intersects with any one of the first straight lines included in the set V, the state setting unit 26 sets the status of the mesh corresponding to the intersection point with the first straight line and the status of the meshes adjacent to the aforementioned mesh on the first straight line as update states. In addition, when the line segment included in the set L intersects with any second straight line included in the set H, the state setting unit 26 sets the status of the mesh corresponding to the intersection point with the second straight line and the status of the meshes adjacent to the aforementioned mesh on the second straight line as update states.

Figure 11:
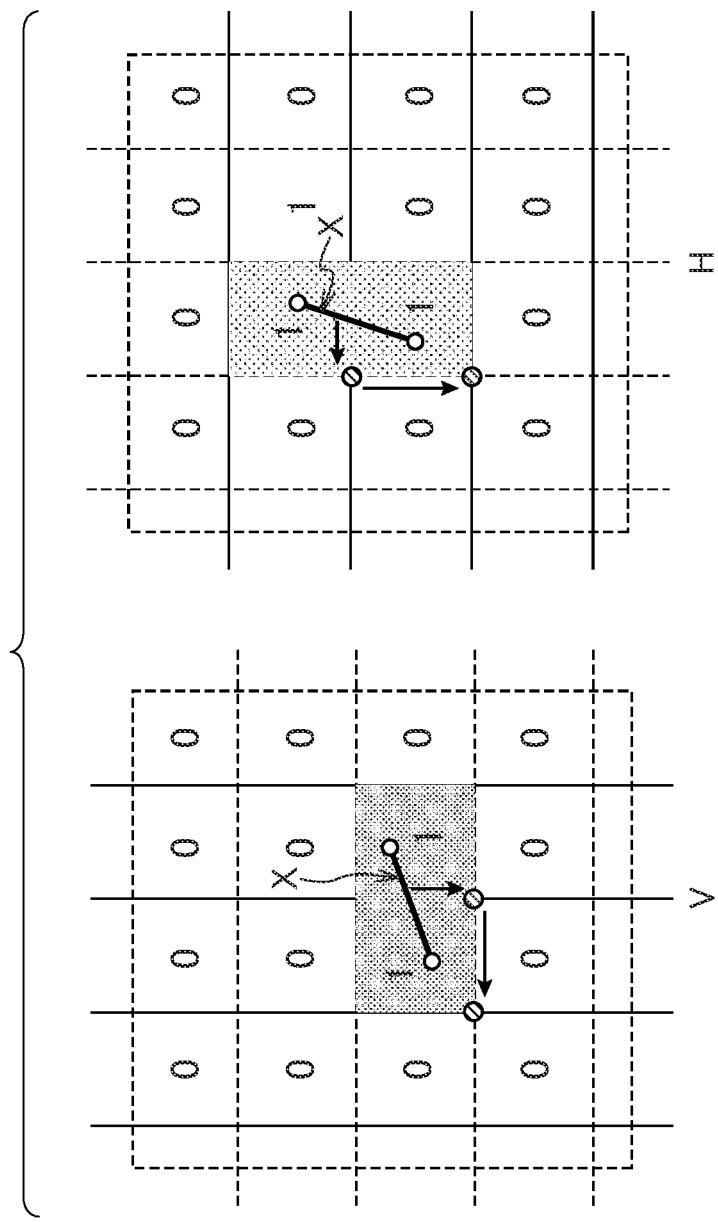
FIG. 11 is a diagram for explaining updating of a mesh state.

FIG. 11 shows a diagram for explaining the state update of the mesh when the line segment overlaps with the first straight line or the second straight line. As shown on the left side of FIG. 11, when the line segment X included in the set L and the first straight line intersect, the state setting unit 26 sets the status of the mesh corresponding to the intersection point with the first straight line and the status of the meshes adjacent to the aforementioned mesh on the first straight line to "1". In the example on the left side of FIG. 11, the state of the mesh corresponding to the intersection point with the first straight line and the mesh adjacent on the west side is set as "1".

Further, as shown on the right side of FIG. 11, when the line segment X included in the set L and the second straight line intersect, the state setting unit 26 sets the status of the mesh corresponding to the intersection point with the second straight line and the status of the meshes adjacent to the aforementioned mesh on the second straight line to "1". In the example on the right side of FIG. 11, the state of the mesh corresponding to the intersection point with the second straight line and the mesh adjacent on the west side is set as "1".

Figure 12:
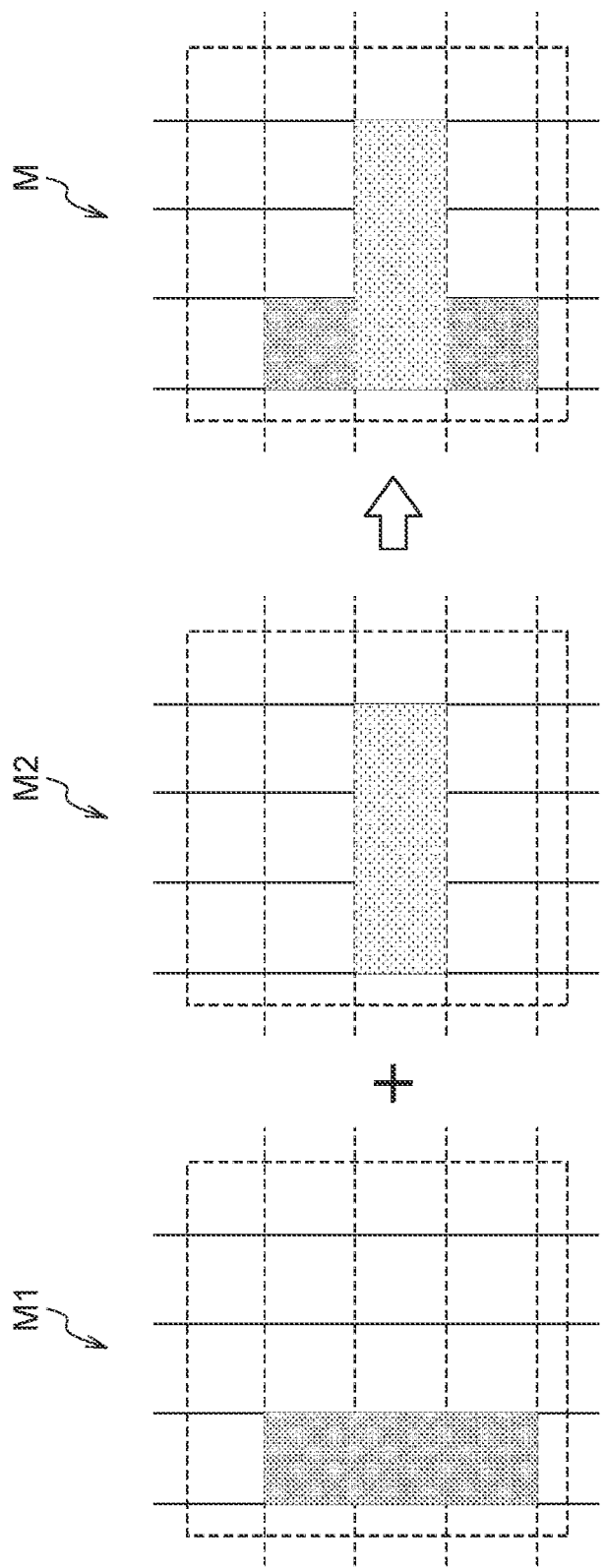
FIG. 12 is a diagram for explaining updating of a mesh state.

Next, the state setting unit 26 calculates the logical sum of the states of the meshes obtained by each of the above-mentioned setting processings, and obtains the final result. FIG. 12 shows a diagram for explaining the logical sum of each setting process. As shown in FIG. 12, the state setting unit 26 calculates the logical sum of the result M1 and the result M2, and generates the final mesh state M. The result M1 is a result in which the mesh for which data collection is necessary is specified by the relationship between the first straight line in the north-south direction and the line segment of the road link. The result M2 is a result in which the mesh for which data collection is necessary is specified by the relationship between the second straight line in the east-west direction and the line segment of the road link.

Figure 13:
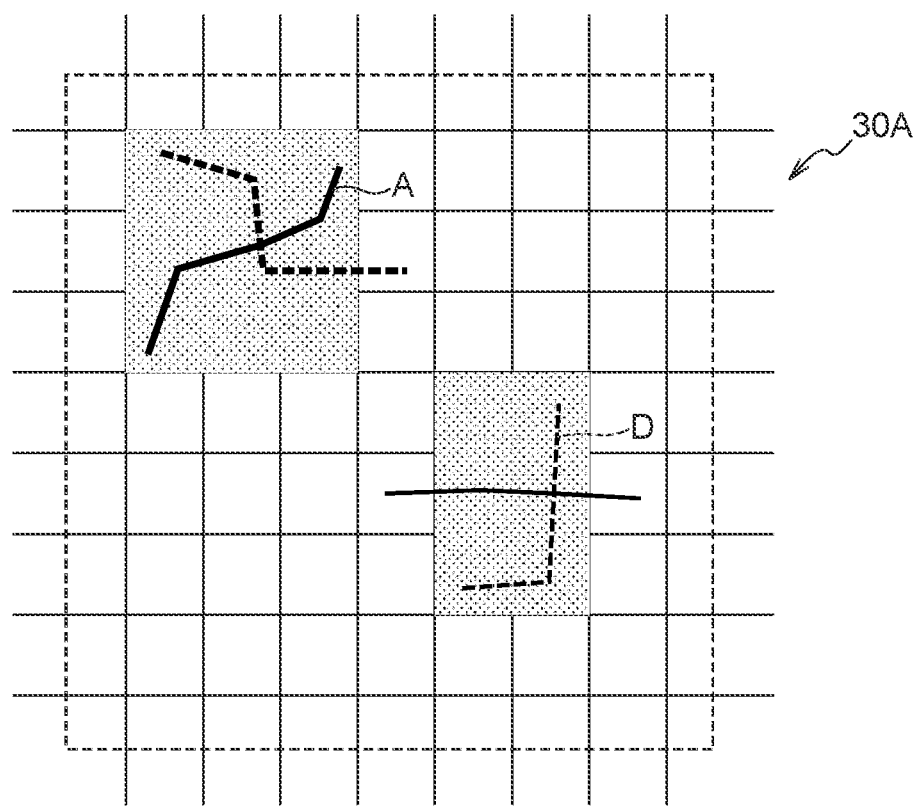
FIG. 13 is a diagram for explaining updating of a mesh state.

In addition, when a road link that requires data acquisition is added to the map data, the data update device 14 updates, based on the set L, the set V, and the set H, the status of each mesh corresponding to the part including the road link. For example, as shown in FIG. 13, when the road link A is newly added or when the road link D is deleted, it is necessary to acquire the data of those road links. Therefore, as shown in FIG. 13, when the road link A is newly added or the road link D is deleted, the data update device 14 updates, based on the set L, the set V, and the set H, the state of each mesh corresponding to the portion including the road link.

As a result, for example, when a new road is created and a new road link is set on the map data, by determining the relationship between each line segment of the line segment sequence representing the road link and the first straight line and the second straight line is determined, it is possible to determine whether or not each mesh formed on the map data needs to be updated.

In conventional techniques, when a new road link is formed on the map data, it is necessary to determine whether or not the data needs to be updated for each mesh on the map data. On the other hand, the data updating device 14 of the present embodiment determines the relationship between the line segment of the road link and the plurality of first straight lines extending in the north-south direction, and determines the relationship between the line segment of the road link and the plurality of east-west extending lines. As a result, the amount of calculation can be reduced as compared with the conventional techniques.

Specifically, when there are N×N meshes on the map data, N×N determination processes are required in the conventional technique. On the other hand, in the data updating device 14 of the present embodiment, since the determination between the first straight lines in the north-south direction is about 3N times and the determination between the second straight lines in the east-west direction is about 3N times, N is a constant multiple of the determination process. Therefore, according to the data updating device 14 of the present embodiment, it is possible to reduce the calculation load when determining the update of the map data.

The communication unit 28 transmits the mesh map data in which the state of each mesh has been updated by the state setting unit 26 to the in-vehicle device 13 of the vehicle 12.

Based on the state of each mesh transmitted from the data updating device 14, the vehicle-mounted device 13 of the vehicle 12 transmits, for example, when the own vehicle is located on the mesh to which "1" is given, the image captured at that location to the data updating device 14. As a result, the data at the location necessary for updating the map data is appropriately transmitted to the data updating device 14.

The data updating device 14 can be realized by, for example, a computer 50 as shown in FIG. 14. The computer 50 includes a CPU 51, a memory 52 as a temporary storage area, and a non-volatile storage unit 53. Further, the computer 50 also includes an input/output interface I/F 54 to which an input/output device is connected, and a read/write R/W unit 55 that controls reading and writing of data with respect to the recording medium 59. Further, the computer 50 also includes a network I/F 56 connected to a network such as the Internet. The CPU 51, the memory 52, the storage unit 53, the input/output I/F 54, the R/W unit 55, and the network I/F 56 are connected to each other via a bus 57.

The storage unit 53 can be realized by a Hard Disk Drive, a solid state drive, a flash memory, or the like. A program for operating the computer 50 is stored in the storage unit 53 as a storage medium. The CPU 51 reads the program from the storage unit 53, outputs it to the memory 52, and sequentially executes the processes included in the program.

Next, the operation of the data updating device 14 of the present embodiment will be described.

Figure 15:
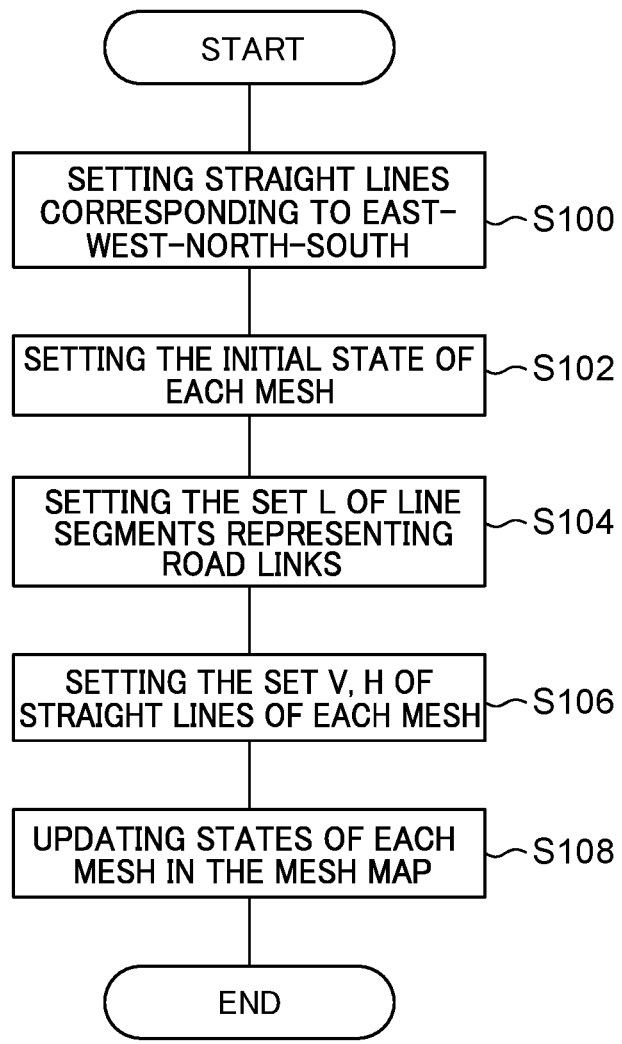
FIG. 15 is a diagram showing an example of a data updating process executed by the data updating device according to the present embodiment.

When the data update device 14 receives the instruction signal for the update process of the mesh state, the data update device 14 executes the data update process routine shown in FIG. 15.

In step S100, the mesh map data setting unit 20 generates mesh map data by setting a plurality of first straight lines extending in the north-south direction and a plurality of second straight lines extending in the east-west direction with respect to the map data stored in the map data storage unit 18.

In step S102, the initial state setting unit 22 sets "0" as the initial state of each mesh surrounded by the plurality of first straight lines and the plurality of second straight lines set in step S100.

In step S104, the set setting unit 24 breaks a line segment sequence representing a road link on the map data stored in the map data storage unit 18 into line segments, and sets a set L of these line segments.

In step S106, the set setting unit 24 sets the set V including the plurality of first straight lines and the set H including the plurality of second straight lines set in step S100.

In step S108, the state setting unit 26 determines, based on the set L set in step S104 and the set V and the set H set in step S106, whether or not each data in the plurality of meshes of the mesh map data is required to be updated.

Then, the state setting unit 26 sets "1" as the update state for the mesh determined as requiring updating. Then, the data update device 14 ends the data update processing routine.

The communication unit 28 transmits the mesh map data that has been updated by the state setting unit 26 to the in-vehicle device 13 of the vehicle 12. Based on the mesh map data transmitted from the data updating device 14, the vehicle-mounted device 13 of the vehicle 12 transmits, for example, when the own vehicle is located on the mesh to which "1" is given, the image captured at that location to the data updating device 14.

As described above, the data updating device 14 according to the present embodiment sets a plurality of first straight lines extending in a first direction and a plurality of second straight lines extending in a second direction that intersects with the first direction with respect to the map data. As a result, the data updating device 14 generates a plurality of meshes surrounded by the plurality of first straight lines and the plurality of second straight lines, and generates mesh map data. Then, the data updating device 14 sets a set L of road link line segments that represent the update location, sets a set V including a plurality of first straight lines, and sets a set H including a plurality of second straight lines. Then, when the point or line segment included in the set L overlaps with any one of the first straight lines included in the set V, based on the set L, the set V, and the set H, the data update device 14 sets the state of the mesh corresponding to the position where the first straight line and the point or line segment overlap as the update state. The update state represents a state in which data needs to be updated. In addition, when the line segment included in the set L overlaps with any second straight line included in the set H, the data update device 14 sets the state of the mesh corresponding to the position where the second straight line overlaps with the point or the line segment as update state. Further, when the line segment included in the set L does not intersect with any first straight line included in the set V, the data updating device 14 sets the state of the mesh of the portions corresponding to the first straight line having an intersection point when the start point and the end point of the line segment are projected in the second direction as the update state. Further, when the line segment included in the set L does not intersect with any second straight line included in the set H, the data updating device 14 sets the state of the mesh of the portions corresponding to the second straight line having an intersection point when the start point and the end point of the line segment are projected in the first direction as the update state. In addition, when the point or line segment included in the set L intersects with any first straight line included in the set V, the data updating device 14 sets the status of the mesh corresponding to the intersection point with the first straight line and the status of the meshes adjacent to the aforementioned mesh on the first straight line as update states. In addition, when the line segment included in the set L intersects with any second straight line included in the set H, the data updating device 14 sets the status of the mesh corresponding to the intersection point with the second straight line and the status of the meshes adjacent to the aforementioned mesh on the second straight line as update states. As a result, it is possible to reduce the calculation load when updating the map data used for determining whether or not it is necessary to acquire new data.

Figure 16:
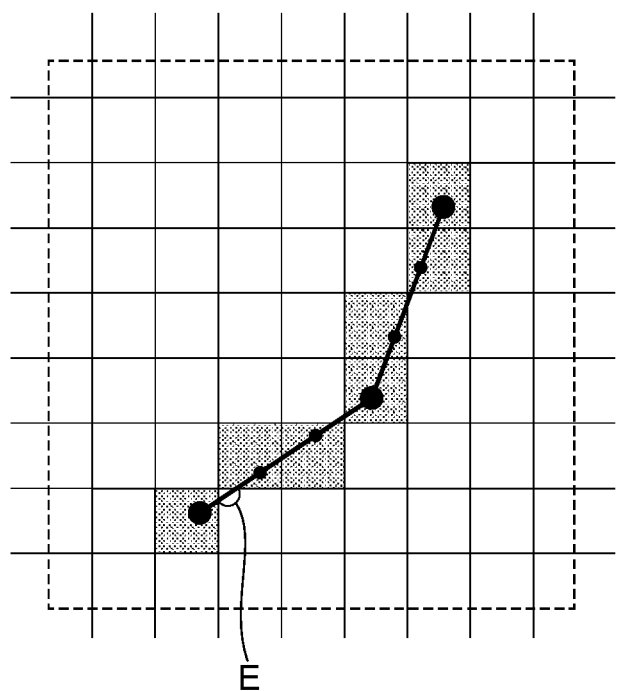
FIG. 16 is a diagram for explaining another method of updating a mesh state.

Further, according to the data updating device 14 of the present embodiment, it is possible to reduce omission of update of the state of the mesh for which data acquisition is required. For example, as a method of updating the state of the mesh, as shown in FIG. 16, giving points at predetermined intervals along a road link for which data acquisition is required, and setting the state of the mesh in which even one point exists as "1" can be thought of. However, in this case, as shown in FIG. 16, the detection failure E of the mesh may occur. On the other hand, when the line segment included in the set L does not intersect with any straight line included in the set V and the set H, the data updating device 14 according to the present exemplary embodiment projects the line segment onto the straight line and updates the state of the mesh. As a result, according to the data updating device 14 of the present embodiment, it is possible to reduce omission of update of the state of the mesh for which data acquisition is required.

Further, by using the updated mesh map data, the data is properly acquired by the in-vehicle device 13 of the vehicle 12, and the data is transmitted to the data updating device 14. Since the mesh map data has a smaller data amount than the normal map data, the calculation load of the vehicle-mounted device 13 of the vehicle 12 can be reduced.

It should be noted that the processing performed by each device in the above-described embodiment is described as software processing performed by executing a program, but it may be processing performed by hardware. Alternatively, the processing may be a combination of both software and hardware. Further, the program stored in the ROM may be stored in various storage media and distributed.

In addition, the technology of the present disclosure is not limited to the above, and in addition to the above, it will be clear that numerous modifications may be embodied within a technical scope not departing from the gist of the disclosure.

For example, although an example in which a case of a line segment sequence of a road link has been divided into line segments is targeted has been described in the above embodiment, the present disclosure is not limited to this. For example, the data update device 14 may set a plurality of points that represent the update location as the set L. An example of what corresponds to a plurality of points is a point of interest. In this case, each mesh of the mesh map data is updated, for example, when a new sign, which is an example of the point of interest, is set up.

In addition, when calculating the logical sum of the states of the meshes, the target data for which the logical sum should be calculated may be collected as a bit string. In this case, for example, eight pieces of data of 0 and 1 representing the state of the mesh are set as one vector, and the logical sum is calculated by the vector operation of these, thereby enabling speeding up of the calculation of the logical sum.

The disclosures of Japanese Patent Application No. 2019-204901 filed on Nov. 12, 2019 are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

DESCRIPTION OF THE SYMBOLS

10 Data collection system
12, 12A, 12B, 12C, 12D Vehicles
13, 13A, 13B, 13C, 13D In-vehicle devices
14 Data update device
18 Map data storage section
20 mesh map data setting section
22 Initial state setting section 24 Collection setting section
26 State setting section
28 Communications unit
50 computers

What is claimed is:

1. A data updating system, comprising:
one or more vehicle; and
a data updating device including:
   a memory; and
   a first processor coupled to the memory, the first processor being configured to:
      with respect to map data, set a plurality of first straight lines extending in a first direction and a plurality of second straight lines extending in a second direction that intersects with the first direction to thereby generate a plurality of meshes that are surrounded by the plurality of first straight lines and the plurality of second straight lines, and generate mesh map data including the plurality of meshes;
      set a group L of points or line segments, which represent an update location, set a group V including the plurality of first straight lines, and set a group H including the plurality of second straight lines;
      based on the group L, the group V, and the group H, which have been set:
         in a case in which the points or the line segments included in the group L overlap with any of the plurality of first straight lines included in the group V, set a status of a mesh corresponding to locations at which the plurality of first straight lines and the points or the line segments overlap as an update status, which indicates a state in which a data update of the mesh map data at the mesh is required;
         in a case in which the points or the line segments included in the group L overlap with any of the plurality of second straight lines included in the group H, set a status of a mesh corresponding to locations at which the plurality of second straight lines and the points or the line segments overlap as the update status;
         in a case in which the points or the line segments included in the group L do not intersect with any of the plurality of first straight lines included in the group V, set a status of a mesh of a location corresponding to a first straight line having an intersection point when a start point and an end point of the points or the line segments are projected in the second direction as the update status;
         in a case in which the points or the line segments included in the group L do not intersect with any of the plurality of second straight lines included in the group H, set a status of a mesh of a location corresponding to a second straight line having an intersection point when a start point and an end point of the points or the line segments are projected in the first direction as the update status;
         in a case in which the points or the line segments included in the group L intersect with any of the plurality of first straight lines included in the group V, set a status of a mesh corresponding to an intersection point with the first straight line and a status of a mesh adjacent to the mesh corresponding to an intersection point with the first straight line on the first straight line as the update status; and
         in a case in which the points or the line segments included in the group L intersect with any of the plurality of second straight lines included in the group H, set a status of a mesh corresponding to an intersection point with the second straight line and a status of a mesh adjacent to the mesh corresponding to an intersection point with the second straight line on the second straight line as the update status; and
      transmit mesh map data in which the state of the mesh is the update status to the one or more vehicle,
   wherein the one or more vehicle includes:
      a camera; and
      an in-vehicle device including a second processor configured to:
         receive the mesh map data in which the state of the mesh is the update status from the data updating device; and
         provide data for updating the mesh map data by transmitting an image captured by the camera at a location corresponding to the mesh whose status is the update status to the data updating device.

2. The data updating device according to claim 1, wherein the first processor is configured to split a line segment sequence representing a road link into line segments to thereby set the group L of a plurality of split line segments.

3. The data updating device according to claim 2, wherein, in a case in which a road link for which acquisition of data is required is added to the map data, the first processor is configured to update a status of each mesh corresponding to a part including the road link for which acquisition of data is required based on the group L, the group V, and the group H corresponding to the road link for which acquisition of data is required.

4. A data updating method that is executed by a data updating device comprising a memory and a first processor coupled to the memory and one or more vehicle comprising a camera and an in-vehicle device including a second processor, the method comprising:
   by the first processor:
      with respect to map data, setting a plurality of first straight lines extending in a first direction and a plurality of second straight lines extending in a second direction that intersects with the first direction to thereby generate a plurality of meshes that are surrounded by the plurality of first straight lines and the plurality of second straight lines, and generate mesh map data including the plurality of meshes;
      setting a group L of points or line segments, which represent an update location, setting a group V including the plurality of first straight lines, and setting a group H including the plurality of second straight lines;
      based on the group L, the group V, and the group H, which have been set:
         in a case in which the points or the line segments included in the group L overlap with any of the plurality of first straight lines included in the group V, setting a status of a mesh corresponding to locations at which the plurality of first straight lines and the points or the line segments overlap as an update status, which indicates a state in which a data update of the mesh map data at the mesh is required;

in a case in which the points or the line segments included in the group L overlap with any of the plurality of second straight lines included in the group H, setting a status of a mesh corresponding to locations at which the plurality of second straight lines and the points or the line segments overlap as the update status;

in a case in which the points or the line segments included in the group L do not intersect with any of the plurality of first straight lines included in the group V, setting a status of a mesh of a location corresponding to a first straight line having an intersection point when a start point and an end point of the points or the line segments are projected in the second direction as the update status;

in a case in which the points or the line segments included in the group L do not intersect with any of the plurality of second straight lines included in the group H, setting a status of a mesh of a location corresponding to a second straight line having an intersection point when a start point and an end point of the points or the line segments are projected in the first direction as the update status;

in a case in which the points or the line segments included in the group L intersect with any of the plurality of first straight lines included in the group V, setting a status of a mesh corresponding to an intersection point with the first straight line and a status of a mesh adjacent to the mesh corresponding to an intersection point with the first straight line on the first straight line as the update status; and in a case in which the points or the line segments included in the group L intersect with any of the plurality of second straight lines included in the group H, setting a status of a mesh corresponding to an intersection point with the second straight line and a status of a mesh adjacent to the mesh corresponding to an intersection point with the second straight line on the second straight line as the update status; and transmitting mesh map data in which the state of the mesh is the update status to the one or more vehicle; and by the second processor:

receiving the mesh map data in which the state of the mesh is the update status from the data updating device; and providing data for updating the mesh map data by transmitting an image captured by the camera at a location corresponding to the mesh whose status is the update status to the data updating device.

5. A non-transitory storage medium that stores a data updating program that causes a first processor of a data updating device and a second processor of one or more vehicle including a camera to execute processing, the processing including:

by the first processor:

with respect to map data, setting a plurality of first straight lines extending in a first direction and a plurality of second straight lines extending in a second direction that intersects with the first direction to thereby generate a plurality of meshes that are surrounded by the plurality of first straight lines and the plurality of second straight lines, and generate mesh map data including the plurality of meshes;

setting a group L of points or line segments, which represent an update location, setting a group V including the plurality of first straight lines, and setting a group H including the plurality of second straight lines;

based on the group L, the group V, and the group H, which have been set:

in a case in which the points or the line segments included in the group L overlap with any of the plurality of first straight lines included in the group V, setting a status of a mesh corresponding to locations at which the plurality of first straight lines and the points or the line segments overlap as an update status, which indicates a state in which a data update of the mesh map data at the mesh is required;

in a case in which the points or the line segments included in the group L overlap with any of the plurality of second straight lines included in the group H, setting a status of a mesh corresponding to locations at which the plurality of second straight lines and the points or the line segments overlap as the update status;

in a case in which the points or the line segments included in the group L do not intersect with any of the plurality of first straight lines included in the group V, setting a status of a mesh of a location corresponding to a first straight line having an intersection point when a start point and an end point of the points or the line segments are projected in the second direction as the update status;

in a case in which the points or the line segments included in the group L do not intersect with any of the plurality of second straight lines included in the group H, setting a status of a mesh of a location corresponding to a second straight line having an intersection point when a start point and an end point of the points or the line segments are projected in the first direction as the update status;

in a case in which the points or the line segments included in the group L intersect with any of the plurality of first straight lines included in the group V, setting a status of a mesh corresponding to an intersection point with the first straight line and a status of a mesh adjacent to the mesh corresponding to an intersection point with the first straight line on the first straight line as the update status; and in a case in which the points or the line segments included in the group L intersect with any of the plurality of second straight lines included in the group H, setting a status of a mesh corresponding to an intersection point with the second straight line and a status of a mesh adjacent to the mesh corresponding to an intersection point with the second straight line on the second straight line as the update status; and transmitting mesh map data in which the state of the mesh is the update status to the one or more vehicle; and by the second processor:

receiving the mesh map data in which the state of the mesh is the update status from the data updating device; and providing data for updating the mesh map data by transmitting an image captured by the camera at a location corresponding to the mesh whose status is the update status to the data updating device.

\* \* \* \* \*